United States Patent [19]

Apple

[11] 3,720,832

[45] March 13, 1973

[54] INFRARED SCANNING SYSTEM FOR MATERIAL TESTING

[75] Inventor: Wayne Richard Apple, Boulder, Colo.

[73] Assignee: Automation Industries, Inc., Los Angeles, Calif.

[22] Filed: Feb. 3, 1971

[21] Appl. No.: 112,119

[52] U.S. Cl. ............................................. 250/83.3 H
[51] Int. Cl. ................................................ G01j 1/04
[58] Field of Search .................... 250/83.3 H, 83.3 HP

[56] References Cited

UNITED STATES PATENTS

| | | | |
|---|---|---|---|
| 3,118,062 | 1/1964 | Ilgenfritz et al. | 250/83.3 H |
| 3,209,149 | 9/1965 | Tucker | 250/83.3 H X |
| 3,219,822 | 11/1965 | Kutzscher et al. | 250/83.3 H |
| 3,283,148 | 11/1966 | Schwarz et al. | 250/83.3 HP X |
| 3,287,559 | 11/1966 | Barnes | 250/83.3 HP X |
| 3,597,617 | 8/1971 | Passaro | 250/83.3 HP |

Primary Examiner—Archie R. Borchelt
Attorney—Dan R. Sadler

[57] ABSTRACT

Herein described is an infra-red scanning system which includes a rotating scanning block. Reflecting mirrors are disposed about the vertical perphery of the block and are adapted to rotate therewith. A motor including a cam and follower causes the scanning block to continuously nod during the scanning thereof. A workpiece may then be disposed in the path of the scanner and thermal radiations therefrom are reflected to an infra-red detector. A folding mirror system is disposed between the detector and the workpiece and is used to focus the thermal energy to the detector. To decrease the obscurations within the field of view an aperture is placed in the center of the folding mirror and the detector is placed behind the aperture in the folding mirror in alignment with the primary mirror. The thermal energy is then focused from the reflective scanner through the hole in the folding mirror to the detector.

4 Claims, 8 Drawing Figures

PATENTED MAR 13 1973 3,720,832

Wayne R. Apple
INVENTOR.
BY.

R. Sadler
ATTORNEY

Wayne R. Apple,
INVENTOR.

Wayne R. Apple,
INVENTOR.
BY.

ATTORNEY.

INFRARED SCANNING SYSTEM FOR MATERIAL TESTING

BACKGROUND

This invention relates to scanning systems and more particularly to a novel and improved scanning system useful, for example, in the scanning of a workpiece which emits infrared radiations. The system further relates to a novel and improved optic system disposed within the field of view of the detector and the workpiece. Further, this invention relates to an optical scanning system which includes a multi-sided mirror adapted to rotate and scan the workpiece and includes means for causing the rotating scanner to nod during the revolution thereof.

In the prior art several types of nondestructive test systems are available which are capable of inspecting some form of energy into or through the workpiece and observe the manner in which the workpiece and the energy interreact. Of all the forms of energy which have been employed for this purpose, ultrasonic, magnetic, eddy current, X-ray, etc., are most suitable for commercial purposes.

In recent years numerous attempts have been made to develop a commercially satisfactory nondestructive tester employing infra-red and other thermal energies. It is known that thermal conductivity of a workpiece is a function of the type of material. However, the thermal conductivity of the workpiece is also greatly affected by variations of such factors as porosity, voids, inclusions, grain structure, etc. Since thermal conductivity controls the flow of heat, if there are local variations in any of these characteristics, there will be corresponding local variations in the manner in which temperature in the workpiece varies. As a result, the temperatures of the incremental areas of the surface of the workpiece will vary at different rates as the temperature of the workpiece changes. It is thus possible to determine the various characteristics of a workpiece and particularly the presence of internal defects, i.e., a void and inclusion, a variation in the thickness, etc., by observing the surface temperature of the workpiece.

Another type of use of infra-red scanning apparatus is to test and diagnose the human body for variations therein. It is known that the human body emits thermal energy in its own mode. By scanning the temperature gradients of the human body, a diagnostic aid is available whenever diseases or injury produces variations in the skin temperature. This type of scanning can provide early diagnosis and study of various types of tumors, malignancy of bone and soft tissues inflammatory processes within the human body and the like.

Further, it is possible to use, an infra-red scanning system to provide thermal images, especially of a human body which emits the above mentioned thermal energy. Thus, by appropriate scanning methods, thermal facsimiles are provided to show a reproduction of the body which is scanned. The infra-red detector responds to the infra-red radiation naturally emitted by these objects.

In operation an optical system scans the field of view of a highly sensitive infra-red detector across the target. The collected radiation is converted into proportional electrical signals. These signals can then be amplified, processed and displayed on a cathode ray tube, for example, in the form of a thermal image or on a facsimile recorder. From this display target temperature can be determined if the emissivity of the target is known.

These thermal images show the temperature distribution over the surface of the target in shades whereby warmer areas are light and cooler regions are darker or the other way around depending upon the desired recording image. Such a visual display provides investigators with information concerning the nature of the target and inferences as to the subsurface conditions. This information is often unobtainable by other prior art devices. The thermal images may then be photographed to produce thermograms, that is, permanent records of the target's heat distribution. In some cases the images may be recorded directly upon a thermogram. Since such infra-red measurements require no physical contact with the target, observations can be made without disturbing the target's natural environment in any way.

SUMMARY

Briefly described, the present invention includes, in the embodiment shown, an infra-red scanning system which includes a rotating mirror. The described embodiment illustrates a four-sided block having mirrored surfaces about the vertical sides thereof. It should be understood that any number of sides are possible and still remain within the spirit and scope of the present invention. For example, three sided or six sided mirrors. The rotating mirror is slewed as it rotates to complete a raster scan of a workpiece. The workpiece may be of the type which emits thermal radiations in its own mode and exhibits a difference in the radiation emitted therefrom as a function of the structure and substructures of the workpiece. For example, the workpiece being scanned may be a sheet of preheated metal or a human body.

Reflections from the rotating mirror which are indications of the temperature of the workpiece are then presented to a folding mirror and back to a primary spherical mirror. This latter mirror focuses the reflective beam back through an aperture in the folding mirror where it is detected by an infra-red detector. With the detector positioned behind the folding mirror and in the path of the focused energy from the primary mirror, a reduced obscuration in the field of view is thereby provided. This allows the folding mirror to be disposed exactly in front of the primary mirror and thereby reduce the overall size of the optics of the system with this reduced obscuration.

There are presently a number of patents in the prior art which teach the concept of thermal infra-red detecting systems. For example, U.S. Pat. Nos. 3,483,721; 3,451,254; 3,434,332; 3,433,052; 3,427,861, 3,401,551; 3,504,524; and 3,462,602 all of which are incorporated herein by reference. All of these patents are assigned of record to Automation Industries, Inc., the assignee of the present invention.

DRAWINGS

These and other features and advantages will become more apparent to those skilled in the art when taken into consideration with the following detailed description where like reference numerals indicate like and corresponding parts throughout the several views and wherein.

DESCRIPTION

Figure 1:
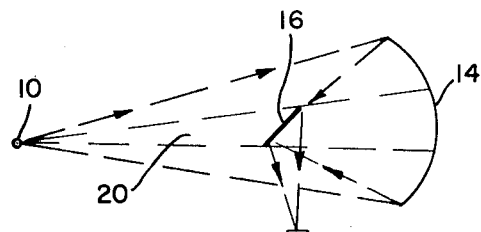
FIGS. 1 and 2 illustrate prior art optic systems which are now in use showing the optic system of infra-red detectors and scanners.

Turning now to a more detailed description of this invention and particularly in relation to prior art optic systems, reference is now made to FIG. 1 whereby a target position 10 is illustrated as emitting thermal energy to be detector by a detector 12. The target 10 may be a workpiece which emits thermal energy, for example, a piece of hot rolling stock from a steel mill. On the other hand, it may be a human body which naturally emits thermal energy in its own mode.

In order to focus the received thermal energy from the target 10 to the detector 12, certain focusing and folding mirrors are used. For example, a primary or focusing mirror 14 is positioned within the field of view of the target 10. Mirror 14 is generally concave in shape and focuses the thermal energy to a single focal point. A folding mirror 16 is provided to reflect the thermal energy towards the detector 12 in order to place the detector 12 outside of the optics field of view and thus reduce obscuration. It can be noted that a certain area of obscuration (area 20) is caused by the mirror 16 between the target 10 and the focusing mirror 14. Thus all of the target energy is not directly detected by the detector 12.

Figure 2:
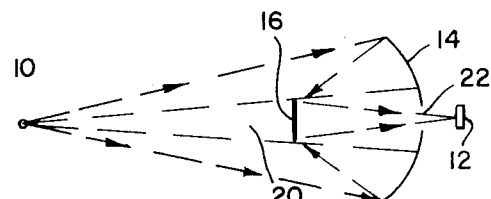

FIG. 2 illustrates yet another prior art method of folding the focused return infra-red images to the detector 12 but in this embodiment it can still be seen that a sufficient area 20 obstructs the infra-red energy radiated towards the detector 12. In this embodiment the folding mirror 16 is placed directly between the primary focusing mirror 14 and the target 10 whereby the folded and reflected infra-red energy is focused through a hole 22 within the primary focusing mirror 14. Still, through, a large obstruction area 20 is within the radiated infra-red energy field.

Figure 3:
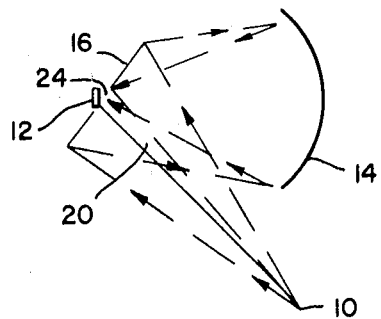
FIG. 3 is a schematic drawing illustrating one embodiment of the optic system used in accordance with the present invention.

With reference now to FIG. 3 there is shown a folding mirror system in accordance with one aspect of this invention. By this embodiment the folding mirror 16 is directly in the path of the radiated beam of the image produced by the target 10. The folding mirror 16 then reflects the radiant thermal energy towards the primary collecting and focusing mirror 14. The mirror 14 is generally spherical in shape and focuses the thermal energy back through an aperture 24 in the folding mirror 16 to detect the energy received from the target 10 and focused thereto. It can be noted by this latter improved method that the area of obstruction (area 20) is reduced to a minimal and in face no larger in area than the size of the aperture 24 in the folding mirror 16.

Figure 4:
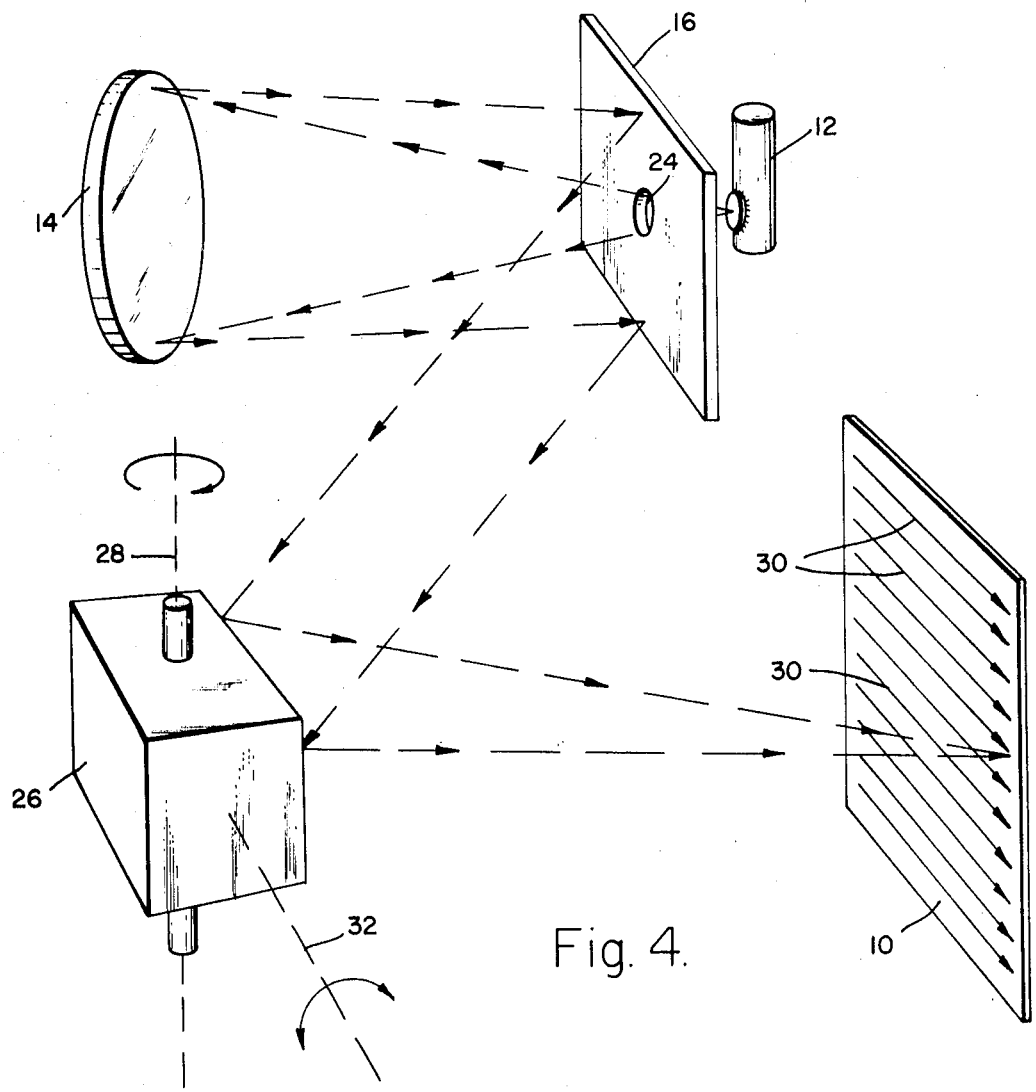
FIG. 4 is a schematic drawing illustrating the positions of various components in accordance with the present invention.

FIG. 4 illustrates a scanning system using the principles of the optic system set forth in FIG. 3. In this embodiment a four-sided member 26 is used which extends on a vertical axis 28 and has four vertical reflective surfaces thereon. To accomplish the four-sided structure a cube shaped block is used with the reflective surfaces being mirrors. The member 26 is positioned within the line of sight of the folding mirror 16 and directs the energy from the target 10 towards the folding mirror 16 whereby it is reflected onto the focusing mirror 14 and back through the aperture 24 to the detector 12.

Means are included to rotate the member 26 as shown on the vertical axis 28 so that a scan is made across the target 20 as illustrated by the scan paths 30. Because the member 26 is rotating in a single direction, the scan in this particularly embodiment, as shown in FIG. 4, always goes in a single direction across the workpiece 10 and in this embodiment as shown going from left to right thereon. In order to scan the workpiece 10 from the top to its bottom, means are included to slew the rotating mirror 26 on a slew axis 32.

Figure 5:
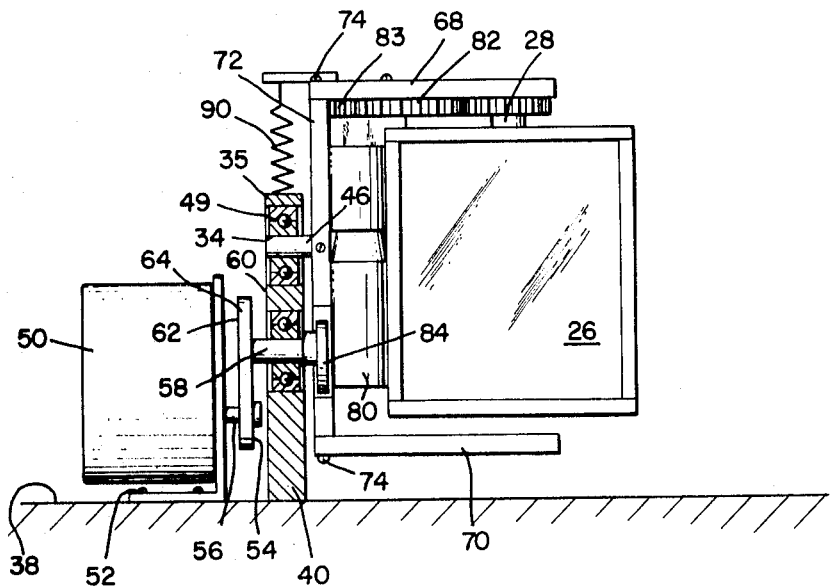
FIG. 5 is a side view illustrating the scanning system in accordance with the present invention.
Figure 6:
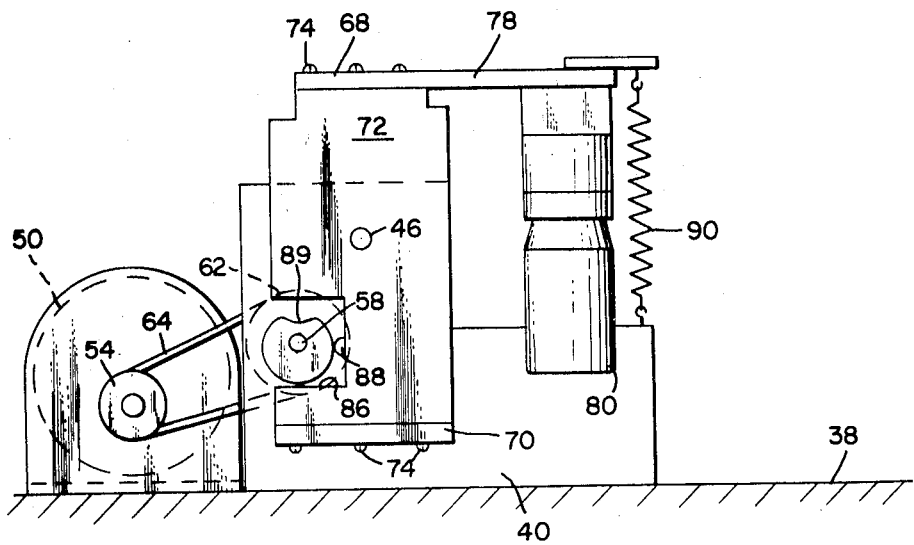
FIG. 6 is a view of the scanning system taken of FIG. 5 with the mirror removed for ease in viewing the scan structure.

Referring now to FIGS. 5 and 6, there is shown a practical embodiment of the present invention to provide for the rotating of the member 26 on the axis 28 and the slewing of the member 26 on the axis 32. The apparatus comprising the shown and described embodiment is positioned on a base plate or frame 38. A vertical extending angle plate 40 is attached to frame 38 in a suitable manner. The vertical extending angle plate 40 has an opening 34 near the top end 35 thereof to receive a shaft 46. The shaft 46 is fixedly mounted to a frame 48 and is rotatably mounted to angle plate 40 through suitable bearing 49. Connection of shaft 46 through opening 34 of angle plate 40 and to frame 48 can be accomplished in any suitable manner. A motor 50 is mounted to a frame 38 by suitable screws 52. A pulley 54 is coupled to shaft 56 of motor 50. A shaft 58 extends through plate 40 and suitable bearings 60. A pulley 62 is coupled to one end of shaft 58 and is connected to pulley 54 with a drive belt 64.

A frame 48 which is substantially C-shaped is provided and includes top and bottom extending arms 68 and 70. A vertical extending plate 72 extends between the top plate 68 and bottom plate 70 and is screwed thereon by the suitable screws 74.

A plate 78 extends outwardly from the top plate 68 of frame 48. A motor 80 is mounted on extension plate 78 and is connected to the shaft 28 of rotating mirror 26 by suitable gears 82 and 83 to impart rotation thereto.

An eccentric cam 84 is connected to shaft 58 which is positioned on the side opposite pulley 62. The C-shaped frame 48 has a cutout portion 86 so that cam 84 can rotate without obstruction therefrom. The cutout 86 of the C-shaped frame 48 has a protrusion which forms a cam follower 88 thereon. As the cam 84 rotates, it rides on follower 88 causing the frame 48 to tilt and thereby tilt mirror 26 causing it to scan the workpiece 10. When the follower 88 reaches the cutout 89 in cam 84, the frame 48 drops back to its original start position assisted by the spring 90 connected between plate 78 and the bottom of plate 40.

Figure 7:
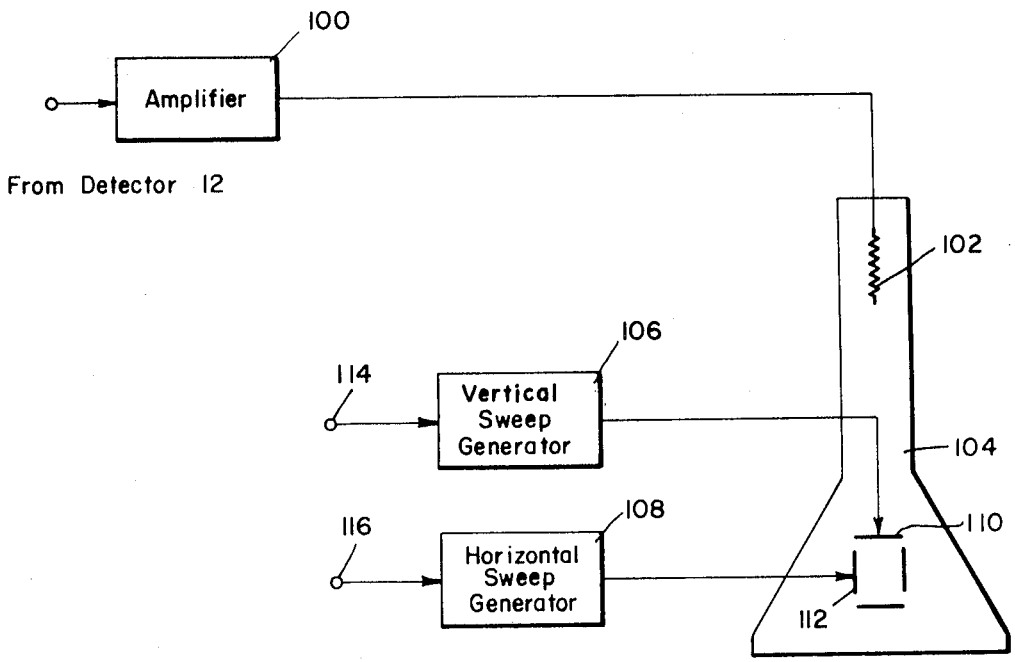
FIG. 7 is a schematic block diagram illustrating electronic systems used with the infra-red scanning device in accordance with one embodiment of the present invention.

The output of detector 12 is an electrical signal which is directly proportional to the amount of thermal energy impinging thereon. This signal is applied through an amplifier 100, as shown in FIG. 7, to the grid 102, of a cathode ray tube 104. A vertical sweep generator 106 and a horizontal sweep generator 108 are coupled directly to the vertical deflection plates 110 of cathode ray tube 104 and horizontal deflection plates 112 of cathode ray tube 104, respectively. Vertical sweep generator 106 is triggered by a pulse vertical scan with relation to the exact slew position of the slew motor 48. Thus each tilt position of the rotating mirror is applied in the form of electrical pulse to the terminal 114 whereby it indexes the sweep vertical generator 106 is a suitable manner.

Likewise the scan position of the rotating mirror as dictated by the motor 80 is applied as an electrical pulse to the terminal 116 and applied to the horizontal sweep generator 108 which causes the sweep signal to sweep across the face of the cathode ray tube 104. Thus the signal from the detector 22 after being amplified and processed is displayed on the cathode ray tube 104 as an intensity modulated raster and a thermal image of its target, i.e., the object being scanned.

Figure 8:
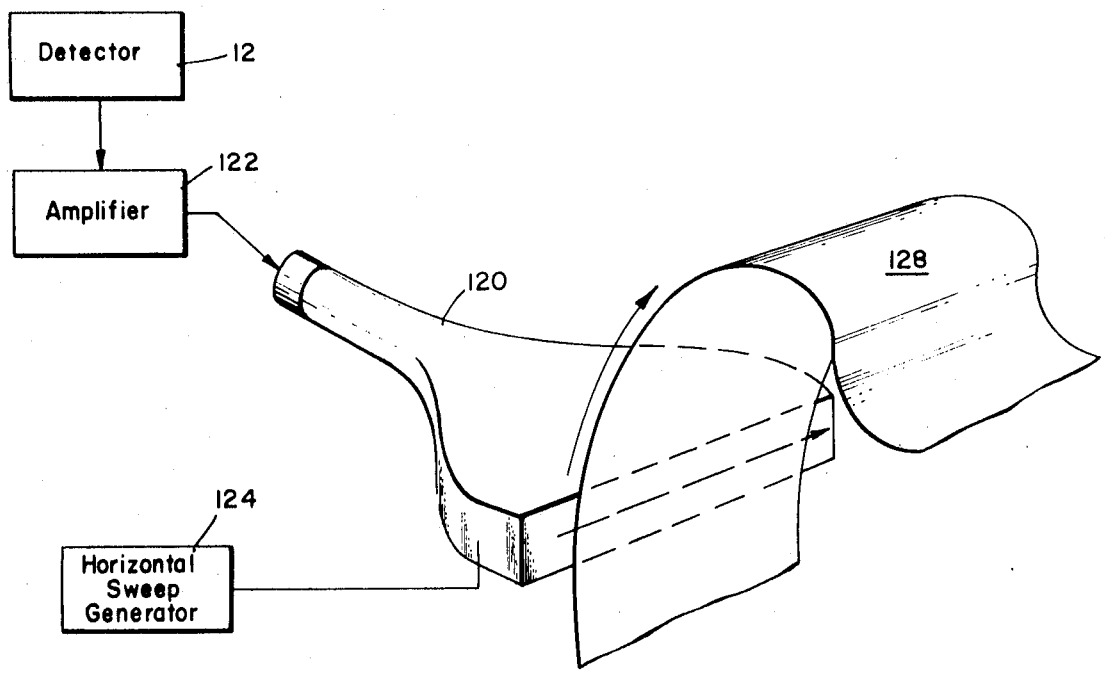
FIG. 8 is a semi-schematic and partial perspective view of another embodiment of a readout means in accordance with the principles of this invention.

FIG. 8 illustrates a further embodiment of a readout/record system of this invention which is a fast scan single line which records on advancing recording paper. A CRT 120 is included which has the grid thereof connected through a suitable amplifier 122 from a detector 12. A horizontal sweep generator 124 is connected to the horizontal deflection electrodes in CRT 120. The horizontal sweep is matched with the rotating motions of the mirror 26. A suitable recording paper 128 is advanced in front of the CRT 120 and is developed in response to the electron beam thereon. The recording paper is in synchronism with the scan of the workpiece 10. As the mirror 26 is scanned from top to bottom on the workpiece 10, the recording paper moves past the CRT at the same rate. The CRT 120 is modulated with the output of detector 12, thereby recording the thermal image on the paper 128.

These signals received from the position of the detector and trigger position of the scans from each of the positions of the rotating mirror and the position of the slew motor can also be applied directly into a thermal facsimile machine which can show thermal facsimiles of the device actually being scanned, whereas the darker portions and lighter portions of the thermal image will be dependent upon the intensity of the infrared radiation received by the detector 12.

Thus having shown but one preferred embodiment of this invention, what is claimed is:

1. In combination:
    a base including a vertically extending member;
    a first horizontal shaft rotatably coupled through the extending member of said base;
    a frame coupled to said first shaft, said frame being spaced from said base and pivotally movable about said first shaft in respect to said base, said frame having a cam follower thereon;
    a multi-sided mirror rotatably mounted to said frame about a vertical axis;
    a second shaft rotatably coupled through said extending member of said base, said second shaft being parallel to said first shaft; and
    an eccentric cam coupled to said second shaft and positioned to engage the cam follower on said frame, whereby rotation of said second shaft imparts tilting movement to said mirror in respect to said base.

2. In the combination as defined in claim 1 wherein said frame being substantially C-shaped having a top member, a bottom member and a vertical member coupled between said top and bottom member, said first shaft being secured to said vertical member, said vertical member including a cutout portion, said eccentric cam being located within said cutout portion, said cam follower located within said cutout portion and in continuous engagement with said cam.

3. The combination of claim 2 including:
    a biasing means connected between said base and said frame, said biasing means exerting a continuous bias upon said frame tending to maintain said follower in contact with said cam.

4. The combination as defined in claim 3 wherein: said biasing means comprises a spring.

* * * * *